United States Patent
Maycock et al.

(10) Patent No.: US 9,457,282 B2
(45) Date of Patent: Oct. 4, 2016

(54) VIRTUAL ATTRACTION CONTROLLER

(71) Applicant: Universal City Studios LLC, Universal City, CA (US)

(72) Inventors: Mark Bruce Maycock, Cambridge Ontario (CA); Eric Vance, Universal City, CA (US)

(73) Assignee: Universal City Studios LLC, Universal City, CA (US)

( * ) Notice: Subject to any disclaimer, the term of this patent is extended or adjusted under 35 U.S.C. 154(b) by 101 days.

(21) Appl. No.: 14/284,270

(22) Filed: May 21, 2014

(65) Prior Publication Data
US 2015/0336012 A1    Nov. 26, 2015

(51) Int. Cl.
*A63G 31/00*    (2006.01)
*A63G 7/00*    (2006.01)
*G05D 1/00*    (2006.01)
*B61L 23/00*    (2006.01)
(Continued)

(52) U.S. Cl.
CPC ............... *A63G 31/00* (2013.01); *A63G 7/00* (2013.01); *B61L 15/0027* (2013.01); *B61L 23/20* (2013.01); *B61L 25/025* (2013.01); *B61L 27/0038* (2013.01); *G05D 1/0022* (2013.01)

(58) Field of Classification Search
CPC ... G05D 1/0022; G05D 1/0027; A63G 31/00
See application file for complete search history.

(56) References Cited

U.S. PATENT DOCUMENTS 5,184,694 A    2/1993  Magrath, Jr. et al.
5,403,238 A *  4/1995  Baxter et al. ................... 472/43
(Continued)

FOREIGN PATENT DOCUMENTS

| EP | 893932    | 1/1999 |
|----|-----------|--------|
| JP | 2014000169| 1/2014 |
| WO | 00/24626  | 5/2000 |

OTHER PUBLICATIONS

PCT International Search Report and Written Opinion dated Jul. 30, 2015.

*Primary Examiner* — Michael J Zanelli
(74) *Attorney, Agent, or Firm* — Fletcher Yoder, P.C.

(57) ABSTRACT

A ride control system includes a plurality of ride vehicles positioned within a course and configured to travel within the course. Each of the plurality of ride vehicles includes a vehicle controller configured to control movement of a respective one of the plurality of ride vehicles. Each of the plurality of ride vehicles also includes a position tracking system configured to facilitate identification of a location of the respective one of the plurality of ride vehicles within the course. Each of the plurality of ride vehicles further includes a vehicle transceiver in communication with the vehicle controller. The ride control system also includes a primary controller and a primary transceiver in communication with the primary controller. The ride control system further includes a primary wireless network formed by the vehicle transceiver and the primary transceiver to include at least the primary controller and the vehicle controller of each of the plurality of ride vehicles. The primary controller is configured to receive data indicative of the location of each of the plurality of ride vehicles from respective ones of the plurality of ride vehicles via the primary wireless network. The primary controller and the vehicle controller of each of the plurality of ride vehicles are configured to coordinate to provide a control loop for each of the plurality of ride vehicles based on the data indicative of the location of each of the plurality of ride vehicles.

20 Claims, 3 Drawing Sheets

(51) Int. Cl.
  *B61L 15/00* (2006.01)
  *B61L 23/20* (2006.01)
  *B61L 25/02* (2006.01)
  *B61L 27/00* (2006.01)

(56) References Cited

U.S. PATENT DOCUMENTS

| | | |
|---|---|---|
| 5,583,844 A | 12/1996 | Wolf et al. |
| 6,109,568 A | 8/2000 | Gilbert et al. |
| 6,124,810 A | 9/2000 | Segal et al. |
| 6,510,381 B2 | 1/2003 | Grounds et al. |
| 7,009,501 B2 | 3/2006 | Olch |
| 7,065,446 B2 | 6/2006 | Chou |
| 7,177,706 B2 | 2/2007 | Schweizer et al. |
| 7,596,438 B2 | 9/2009 | Chen et al. |
| 7,758,435 B2 | 7/2010 | Henry et al. |
| 7,822,424 B2 | 10/2010 | Markhovsky et al. |
| 8,160,765 B2 | 4/2012 | Morselli et al. |
| 8,641,540 B2* | 2/2014 | Feuer et al. .................. 472/43 |
| 2006/0069470 A1* | 3/2006 | Campbell et al. ............. 701/23 |
| 2007/0001904 A1 | 1/2007 | Mendelson |
| 2007/0089630 A1* | 4/2007 | Gordon .......................... 104/53 |
| 2009/0063036 A1* | 3/2009 | King et al. ................... 701/207 |
| 2011/0054731 A1 | 3/2011 | DeRose et al. |

* cited by examiner

VIRTUAL ATTRACTION CONTROLLER

BACKGROUND

The present disclosure relates generally to a system and method for controlling an attraction and, more particularly, to a system and method for controlling motion of a vehicle or a show event in an attraction course.

Theme park or amusement park ride attractions have become increasingly popular. Amusement park rides often include traveling rides, which include ride vehicles that travel along a path (e.g., a railway or a track), fixed rides, which may include a motion base, or combinations thereof. The path of a traveling ride may be situated in different surroundings (e.g., on a mountain top, in a tunnel, under the water). Along the path, there may be different types of show events, such as moving action figures (e.g., animatronics), video screen projections, sound effects, water effects, and so forth. In fixed rides, a movable passenger platform having multiple degrees of freedom is typically situated on a relatively still base. The passenger platform can move in several different directions including angular movements, such as roll, pitch and yaw, and linear movements, such as heave and surge. The passenger platform is also frequently positioned adjacent one or more projection screens showing a series of images or a motion picture. For added realism and effect, the movement of the passenger platform can be synchronized with the projected images or motion picture.

Controlling and monitoring of amusement park rides are generally carried out using a central controller or computer. For example, the central controller may monitor each ride vehicle's position on an associated path and when vehicle spacing is within a predetermined minimum distance, all ride vehicles on the path may be stopped. The central controller may also trigger show events, such as video screen projections, based on ride vehicle positioning. Such control systems often include multiple sensors mounted at various locations along the path with complex wiring for connecting each sensor to the central controller. It is now recognized that such traditional control systems can be costly to maintain and difficult to integrate.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one aspect of the present disclosure, a ride control system includes a plurality of ride vehicles positioned within a course and configured to travel within the course. Each of the plurality of ride vehicles includes a vehicle controller configured to control movement of a respective one of the plurality of ride vehicles. Each of the plurality of ride vehicles also includes a position tracking system configured to facilitate identification of a location of the respective one of the plurality of ride vehicles within the course. Each of the plurality of ride vehicles further includes a vehicle transceiver in communication with the vehicle controller. The ride control system also includes a primary controller and a primary transceiver in communication with the primary controller. The ride control system further includes a primary wireless network formed by the vehicle transceiver and the primary transceiver to include at least the primary controller and the vehicle controller of each of the plurality of ride vehicles. The primary controller is configured to receive data indicative of the location of each of the plurality of ride vehicles from respective ones of the plurality of ride vehicles via the primary wireless network. The primary controller and the vehicle controller of each of the plurality of ride vehicles are configured to coordinate to provide a control loop for each of the plurality of ride vehicles based on the data indicative of the location of each of the plurality of ride vehicles.

In accordance with another aspect of the present disclosure, a ride control system includes a plurality of ride vehicles positioned within a course and configured to travel within the course. Each of the plurality of ride vehicles includes a vehicle controller configured to control movement of a respective one of the plurality of ride vehicles. Each of the plurality of ride vehicles also includes a position tracking system configured to facilitate identification of a location of the respective one of the plurality of ride vehicles within the course. Each of the plurality of ride vehicles further includes a vehicle transceiver in communication with the vehicle controller. The ride control system also includes a primary controller and a primary transceiver in communication with the primary controller. The ride control system further includes a primary wireless network formed by the vehicle transceiver and the primary transceiver to include at least the primary controller and the vehicle controller of each of the plurality of ride vehicles. The primary controller is configured to receive a first set of data indicative of the location of each of the plurality of ride vehicles from respective ones of the plurality of ride vehicles via the primary wireless network. The ride control system still includes a backup controller in communication with the primary controller and a backup transceiver in communication with the backup controller. The ride control system also includes a backup wireless network formed by the vehicle transceiver and the backup transceiver to include at least the backup controller and the vehicle controller of each of the plurality of ride vehicles. The backup controller is configured to receive a second set of data indicative of the location of each of the plurality of ride vehicles from respective ones of the plurality of ride vehicles via the backup wireless network. The ride control system further includes a bi-directional voting circuit configured to compare the first set of data and the second set of data, and to select between the first set of data and the second set of data. The primary controller or the backup controller, and the vehicle controller of each of the plurality of ride vehicles are configured to coordinate to provide a control loop for each of the plurality of ride vehicles based on one of the first set or the second set of data indicative of the location of each of the plurality of ride vehicles.

In accordance with another aspect of the present disclosure, a method for controlling a plurality of ride vehicles within a course includes identifying a location of each of the plurality of ride vehicles. The method also includes transmitting the location of each of the plurality of ride vehicles to a system controller via a primary wireless network. The primary wireless network includes the system controller and a vehicle controller of each of the plurality of ride vehicles. The method further includes transmitting the location of each of the plurality of ride vehicles to a backup controller via a backup wireless network. The backup wireless network includes the backup controller and a vehicle controller of each of the plurality of ride vehicles. The method still includes selecting one selected location from the location received by the system controller and the location received by the backup controller with a bi-directional circuit. The method also includes controlling, with the system controller, a movement of each of the plurality of ride vehicles based on the one selected location.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
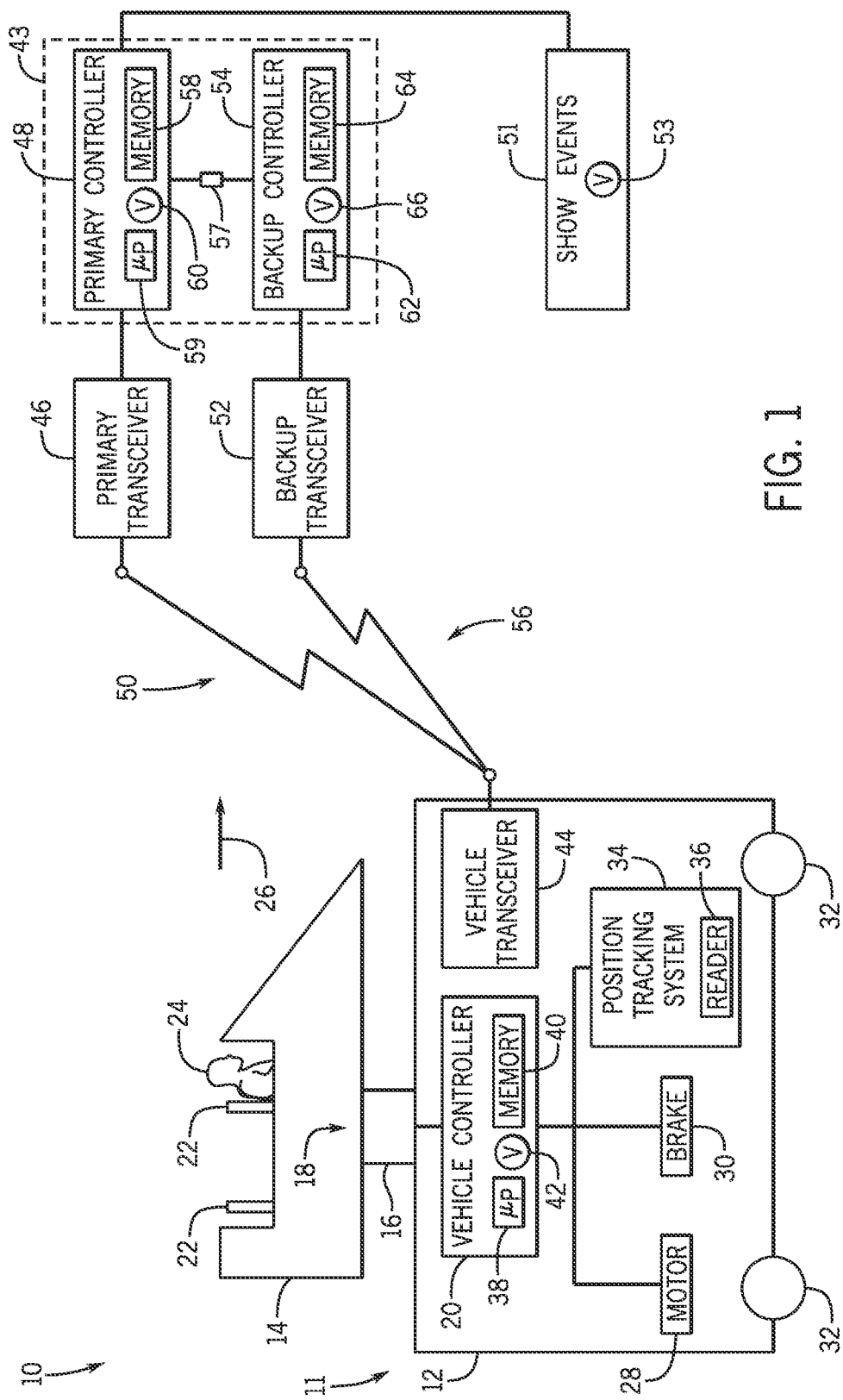
FIG. 1 is a schematic representation of an embodiment of a ride control system in accordance with the present disclosure.

The present disclosure provides a ride control system including a plurality of ride vehicles positioned within a course and configured to travel within the course. Each of the plurality of ride vehicles includes a vehicle controller configured to control movement of the respective ride vehicle. The movement of each ride vehicle may include external movements, such as running and stopping of the ride vehicle in the course, and internal movements, such as rotation and tilting of a passenger platform with respect to a base of the ride vehicle. Each of the plurality of ride vehicles also may include a position tracking system configured to facilitate identification of a location of the respective ride vehicle within the course. Each vehicle controller is connected to a vehicle transceiver.

The ride control system also includes a system controller that includes a primary controller and a backup controller. The primary controller is connected to a primary transceiver. A primary wireless network is formed by the primary transceiver and the plurality of vehicle transceivers. Thus, the primary wireless network includes the primary controller and the plurality of vehicle controllers. Via the primary wireless network, the primary controller may receive data indicative of the status (e.g., position and velocity) of each of the plurality of ride vehicles, and, based on the received data, send instructions to adjust the movement of the respective ride vehicle. For example, the primary controller, upon receiving data indicating a first ride vehicle is approaching a second ride vehicle at an excessive speed, may direct the first ride vehicle to decelerate or stop.

In addition, the primary controller, in some embodiments, is connected to and controls operations of one or more show events within the course. The show events may include video projection of images or motion pictures, performance of action figures or cartoon characters, sound effects, or the like. Based on the received data indicative of the status (e.g., position and velocity) of each of the plurality of ride vehicles, the primary controller may send instructions to the respective ride vehicle and/or the show events to synchronize the movement of the respective ride vehicle with the show events. For example, the primary controller may trigger a show event earlier when a ride vehicle travels toward the show event at a higher speed. Also, for example, the primary controller may send instructions to the ride vehicle to adjust its speed of traveling and rotation of the seat to synchronize with different show elements of the show event.

In accordance with the present disclosure, the primary controller monitors and controls each of the plurality of ride vehicles independently. For example, the primary controller may control the running and stopping of each of the plurality of ride vehicles independently. The primary controller may direct one ride vehicle to bypass the main path to enter a maintenance station while keeping other ride vehicles running on the main path. The primary controller may set independent show event clocks of a show event with respect to different ride vehicles and adjust the movement of the ride vehicles to synchronize with the corresponding show event clocks.

Furthermore, in accordance with the present disclosure, the system controller of the ride control system may also include the backup controller with an associated backup transceiver. The backup transceiver and the plurality of vehicle transceivers form a backup wireless network. Via the backup wireless network, the backup controller monitors the position and velocity of each of the plurality of the ride vehicles in addition to, and independent of, the primary controller. Thus, the backup controller can be utilized to provide independent data for added accuracy or robustness of position monitoring of the plurality of ride vehicles. In case of failure of the primary controller or the primary wireless network, the backup controller may control the movement of the plurality of ride vehicles.

Moreover, the ride control system may monitor the performance degradation of each of the plurality of ride vehicles by recording operational status factors, such as velocity or motor output, over a period of time. This allows for prediction of maintenance status of each of the plurality of ride vehicles. Furthermore, the ride control system in accordance with the present disclosure may also calculate virtual blocking zones of each of the plurality of ride vehicles, thereby removing physical breaks between zones of the course. For example, based on the received data indicative of position and velocity of each of the plurality of ride vehicles, the primary controller may calculate virtual blocking zones around (e.g., in front of, in back of) the respective ride vehicles. Once the calculated virtual blocking zones for different ride vehicles start to overlap, the primary controller may direct one or more of the ride vehicles to adjust their movement (e.g., to slow down or stop) to avoid collision.

With the foregoing in mind, FIG. 1 illustrates a schematic representation of an embodiment of a ride control system 10 in accordance with the present disclosure. The ride control system 10 includes a plurality of ride vehicles (e.g., a vehicle 11) positioned within a course and configured to travel within the course. The course may include an open space, a playground, or a path (e.g., a railway or a track). The vehicle 11 includes a base 12 and a passenger platform 14 (e.g., a passenger seating area) on top of the base 12. An actuator 16, which may represent multiple actuators, connects the base 12 and the passenger platform 14 about a central region 18 of the passenger platform 14. A vehicle controller 20 controls the actuator 16 to impart motion in multiple degrees of freedom on the passenger platform 14. Such internal motion of the passenger platform 14 with respect to the base 12 may include angular movements, such as roll, pitch and yaw, and linear movements, such as heave and surge. The actuator 16 may be any suitable type actuator for providing motion, including, but not limited to, electrical, hydraulic, pneumatic, mechanical, or any combination thereof. In some embodiments, the actuator 16 represents a set of multiple actuators that connect the base 12 and the passenger platform 14 and provide motion of the passenger platform in multiple degrees of freedom.

In the illustrated embodiment, the passenger platform 14 includes one or more seats 22 on which one or more passengers 24 may sit. The vehicle 11 moves within the course in a general direction, illustrated by an arrow 26. One or more show events, as discussed in greater detail below, may be disposed within the course. When the vehicle 11 moves in the direction 26 and approaches a show event, the show event may be triggered, and the passenger 24 may view, listen to, and/or interact with the show event. For added realism and effect, the show event may be synchronized with the movement of the passenger platform 14. For example, the passenger platform 14 may be rotated with respect to the direction 26 to facilitate viewing the show event as the vehicle 11 passes the show event. The passenger platform 14 may also, for example, tilt to simulate a turn motion of the vehicle 11 as the show event is displaying a car making a turn.

To provide external movements of the vehicle 11, the vehicle 11 includes a motor 28 and a brake 30. In some embodiments, the vehicle 11 may include a steering device, such as a steering wheel. The external movements of the vehicle 11 may include running (e.g., acceleration, deceleration), stopping, and steering of the vehicle 11. The motor 28 may be powered by any suitable power source, including, but not limited to, a battery, a solar panel, an electrical generator, a gas engine, or any combination thereof. The brake 30 may be mounted to one or more wheels 32 of the vehicle 11. The operations of the motor 28 and the brake 30 may be controlled by the vehicle controller 20. For example, the vehicle controller 20 may control the motor 28 to adjust its output power to accelerate or decelerate the vehicle 11. The vehicle controller 20 may also control the brake 30 to apply certain amount of force on the wheels 32 to decelerate or stop the vehicle 11. In some embodiments, the steering device may also be controlled by the vehicle controller 20.

The vehicle 11 includes a position tracking system 34 for monitoring its position within the course. As discussed in greater detail below, a plurality of position indicators may be disposed in the course. Each position indicator represents a unique location (e.g., coordinates relative to one or more reference points) within the course. The vehicle position tracking system 34 includes a reader 36. As the vehicle 11 travels in the course and is near a position indicator, the reader 36 may sense the position indicator to provide the position information of the vehicle 11. The reader 36 then supplies the position information to the vehicle controller 20.

The vehicle controller 20 includes various components that may allow for operator interaction with the vehicle 11. The vehicle controller 20 may include an automation controller or set of automation controllers, such as a distributed control system (DCS), a programmable logic controller (PLC), or any computer-based device that is fully or partially automated. For example, the vehicle controller 20 may be any device employing a general purpose or an application-specific processor 38. The vehicle controller 20 may also include a memory 40 for storing instructions executable by the processor 38 to perform the methods and control actions described herein for the vehicle 11. The processor 38 may include one or more processing devices, and the memory 40 (e.g., a hard drive) may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 38 or by any general purpose or special purpose computer or other machine with a processor. While certain example embodiments are described herein as being operable to perform functions with the vehicle controller 20 (e.g., the processor 38), it should be noted that such functions may be performed by the primary controller 48 and/or cooperatively performed by the primary controller 48 and the vehicle controller 20.

The vehicle controller 20 also includes a vehicle clock 42 (e.g., a software clock application) that operates to provide timing information for operations of the vehicle controller 20. For example, the vehicle clock 42 may time stamp when the vehicle controller 20 sends instructions to the motor 28 to accelerate the vehicle 11, or to the brake 30 to stop the vehicle 11. The vehicle clock 42 may also time stamp when the reader 36 reads position information of the vehicle 11. The memory 40 of the vehicle controller 20 stores the position data provided by the reader 36 and the corresponding timing data provided by the vehicle clock 42. For example, the memory 40 may store the position of the vehicle 11 at a specific time and/or during a period of time. The processor 38 may then access the memory 40 for the stored position and timing data and calculate a velocity of the vehicle 11 at any specific time and/or an average velocity during a period of time. The calculated velocity information may also be stored in the memory 40.

The processor 38 of the vehicle controller 20 may also calculate or otherwise establish (e.g., receive from a central controller, such as the primary controller 48) a blocking zone of the vehicle 11 and may likewise identify (e.g., calculate or receive) respective blocking zones for other vehicles on the course. These blocking zones may be described as regions surrounding the respective vehicles (e.g., vehicle 11). If the blocking zone for the vehicle 11 is found to overlap with the blocking zone of another vehicle within the course, the system 10 may take precautions to avoid interference between the two vehicles and the associated distraction of the riders 24 from the desired ride experiences. For example, in determining the blocking zone for vehicle 11 the processor 38 or the system controller 48 may determine, based on the current velocity and loading condition of the vehicle 11, a stopping distance in which the vehicle 11 would come to a full stop with a specific deceleration (e.g., a pre-determined value, or with full force of the brake 30).

The blocking zone may be demarcated as a boundary (e.g., a circle) around the vehicle 11. In one embodiment, the boundary is a circle with the radius of the determined stopping distance in a particular direction. In one embodiment, the boundary may be demarcated as regions (e.g., in front of and behind the vehicle 11) on the path that would establish a desired buffer zone based on measured values associated with the vehicle 11 (e.g., speed) and/or other vehicles. In accordance with the present disclosure, the blocking zone of the vehicle 11 is dynamic because the area of the blocking zone may be adjusted in essentially real-time based on the velocity and position of the vehicle 11. Thus, the blocking zone, which is defined relative to the vehicle 11, moves as the vehicle 11 moves in the course. The size of a blocking zone may also be dynamically adjusted based on a location within a course. For example, it may be desirable to extent blocking zones of vehicles in one or more directions within a particular portion of a course to avoid line of sight between vehicles, which may achieve a desired effect or ride atmosphere (e.g., the perception of being isolated).

The processor 38 of the vehicle controller 20 may also determine a loading condition (e.g., weight of all passengers in the vehicle 11) of the vehicle 11. In one embodiment, the vehicle 11 includes a weight sensor in the passenger platform 14. The weight sensor is configured to sense the weight of all passengers and send the weight data to the vehicle controller 20. In another embodiment, the vehicle controller 20 determines the loading condition based at least on the motor output power and the traveling velocity of the vehicle 11. For example, when the vehicle 11 has a lighter load (e.g., two children riding the vehicle 11 compared to two adults riding the vehicle 11), the motor may have a lower output power to maintain the vehicle at a certain velocity, or the vehicle 11 may accelerate faster to reach a certain velocity with a certain output power. Thus, by recording the velocity change along with the motor output power change, the vehicle controller 20 may determine the weight of all passengers in the vehicle 11.

The ride control system 10 includes a system controller 43 to monitor and control the movement of the vehicle 11. The system controller 43 includes a primary controller 48 and a backup controller 54. The vehicle 11 includes a vehicle transceiver 44 (e.g., may represent a primary vehicle transceiver and a backup vehicle transceiver) that is connected to the vehicle controller 20. The vehicle transceiver 44 communicates wirelessly with a primary transceiver 46 that is connected to the primary controller 48. Therefore, the vehicle controller 20, through the vehicle transceiver 44, is wirelessly connected to the primary controller 48 through the primary transceiver 46. Accordingly, a primary wireless network 50 is created containing at least the primary controller 48 and the vehicle controller 20. As the plurality of the ride vehicles are positioned in the course, each vehicle controller 20 with a vehicle transceiver 44 of the respective ride vehicle of the plurality of ride vehicles may be connected to the primary controller 48 through the primary transceiver 46. Accordingly, the primary wireless network 50 may contain the primary controller 48 and the plurality of vehicle controllers 20.

Data is transferred between the primary controller 48 and the vehicle controller 20 via the primary wireless network 50. The vehicle controller 20 may transfer data indicative of the status of the vehicle to the primary controller 48. Such data may include the vehicle identifier, position, velocity, dynamic blocking zone, traveling direction, motor output power, loading condition, or the like. Based on the received data from the vehicle controller 20, the primary controller 48 may send instructions to the vehicle controller 20 to control the movement of the vehicle 11. For example, the primary controller 48 may compare the dynamic blocking zones of all ride vehicles in the course to determine if any of the ride vehicles are likely to interfere with one another based on their traveling velocities, current positions, and traveling directions. If so, the primary controller 48 may, for example, send instructions to a second ride vehicle that is behind a first ride vehicle to decelerate or stop. In accordance with the present disclosure, the primary controller 48 controls each of the plurality of ride vehicles independently. Thus, in the above example, while the primary controller 48 sends the instructions to the second ride vehicle to decelerate or stop, the primary controller 48 may simultaneously send the instructions to the first ride vehicle to accelerate, or maintain the current velocity, or even decelerate or stop as long as the dynamic blocking zones of the two ride vehicles are determined not to overlap.

In accordance with certain embodiments, the primary controller 48 is also connected to, and controls the operations of, one or more show events 51 in the course. The show event 51 may include video elements (e.g., projection of images or a motion picture), sound effects, moving elements (e.g., flying of an action figure, eruption of a volcano), animatronics (e.g., a walking dinosaur), or any combination thereof. It is contemplated that any suitable show events that may be controlled by a controller may be included in the course. The show event 51 may include a show clock 53. The show clock 53 may time stamp one or more (e.g., all) show elements of the show event 51 as the show event 51 plays. For example, the show clock 53 may time stamp certain images of a sequence of images, certain frames of a motion picture, certain movements in a sequence of movements of an animatronic figure, or the like. In some embodiments, the show clock 53 is integrated with the primary controller 48 instead of the show event 51.

In accordance with the present disclosure, the primary controller 48 may, based on the received data indicative of the status of the vehicle 11, send instructions to the vehicle controller 20 and/or the show event 51 to synchronize the movement of the vehicle 11 with the event 51. For example, the primary controller 48, upon receiving data indicative of a higher traveling velocity of the vehicle 11 from the vehicle controller 20, may trigger the show event 51 to start earlier as the vehicle 11 approaches the show event 51. Conversely, the primary controller 48 may trigger the show event 51 to start later upon receiving data indicative of a lower traveling velocity of the vehicle 11. Also, the primary controller 48 may synchronize the internal movements of the vehicle 11 (e.g., rotation, tilting of the passenger platform 14) with particular show elements of the show event 51. If, for example, the primary controller 48 receives data indicative of a higher traveling velocity of the vehicle 11 from the vehicle controller 20, the primary controller 48 may send instructions to the show event 51 to correspondingly increase the playing speed of the show elements and increase the speed of the internal movements of the vehicle 11, or may send instructions to the vehicle controller 20 to decelerate the vehicle 11 to a matching traveling velocity and decrease the internal movements of the vehicle 11 with regard to the playing speed of the show elements.

In addition to wirelessly communicating with the primary transceiver 46, the vehicle transceiver 44 communicates wirelessly with a backup transceiver 52. In some embodiments, a separate vehicle transceiver (e.g., rather than the vehicle transceiver 44) may be connected to the vehicle controller 20 and may communicated wirelessly with the backup transceiver 52. The backup transceiver 52 is connected to the backup controller 54 of the system controller 43. Therefore, the vehicle controller 20, through the vehicle transceiver 44, is wirelessly connected to the backup controller 54 through the backup transceiver 52. Accordingly, a backup wireless network 56 is created containing at least the backup controller 54 and the vehicle controller 20. When more than one vehicle 11 is positioned in the course, the backup wireless network 56 may contain the primary controller 48 and a plurality of vehicle controllers 20. The backup wireless network 56 may operate at a same communication frequency as, but preferably a different communication frequency from, the primary wireless network 50.

Similar to the primary wireless network 50, data may be transferred between the vehicle controller 20 and the backup controller 54 and via the backup wireless network 56. The vehicle controller 20 may transfer data indicative of the status of the vehicle to the backup controller 54. Such data may include the vehicle identifier, position, velocity, dynamic blocking zone, traveling direction, motor output power, loading condition, or the like. In some embodiments, the backup controller 54, independent of the primary controller 48, may, based on the received data from the vehicle controller 20, send instructions to the vehicle controller 20 to control the movement of the vehicle 11. In addition, the backup controller 54, independent of the primary controller 48, may send instructions to the vehicle controller 20 and/or the show event 51 to synchronize the movement of the vehicle 11 with the event 51.

As noted above, while certain data (e.g., position, velocity, dynamic blocking zone, traveling direction, motor output power, loading condition, or the like) of the vehicle 11 may be calculated or otherwise obtained by the vehicle controller 20 (e.g., the processor 38), it should be noted that such data may be calculated or otherwise obtained by the primary controller 48, the backup controller 54, cooperatively by the primary controller 48 and the vehicle controller 20, and/or cooperatively by the backup controller 48 and the vehicle controller 20.

The system controller 43 includes a bi-directional voting circuit 57 that connects the backup controller 54 and the primary controller 48. The bi-directional voting circuit 57 is configured to compare the position and velocity data of the vehicle 11 received by the primary controller 48 (via the primary wireless network 50) and the backup controller 54 (via the backup wireless network 56). The two sets of data (e.g., position data, velocity data) may have discrepancy due to some errors that may occur in one of the wireless networks 50, 56 or one of the controllers 48, 54. For example, one of the wireless networks 50, 56 may receive interference during data transmission, or one of the controllers 48, 54 may experience system malfunctions at some moment. The bi-directional voting circuit 57 may determine, based on, for example, a pre-stored algorithm, which set of data (e.g., position data or velocity data) is more accurate. This may include a comparison of current data with historical data. Based on the more accurate data of the vehicle 11, the system controller 43 may send instructions to the vehicle controller 20 to control the movement of the vehicle 11. In some embodiments, the primary controller 48 sends consequent instructions to the vehicle controller 20 regardless of which data (e.g., data received by the primary controller 48 or by the backup controller 54) is determined to be more accurate. Only in certain situations (e.g., communication via the primary wireless network 50 is lost, or the primary controller 48 is down), the backup controller 54 may send instructions (e.g., stopping the vehicle 11) to the vehicle controller 20 via the backup wireless network 56. The backup controller 54, however, is not configured to trigger or control the one or more show events 51. In other embodiments, whichever controller (e.g., the primary controller 48 or the backup controller 54) is determined to have received the more accurate data may send consequent instructions to the vehicle controller 20. In these embodiments, the primary controller 48 and the backup controller 54 work independently, but complimentary to each other (e.g., at any time only one controller functions), to control the movement of the vehicle 11 and to synchronize the movement of the vehicle 11 with the event 51.

In some embodiments in accordance with the present disclosure, the system controller 43 may include more than two controllers (e.g., the primary controller 48 and the backup controller 54). For example, the system controller 43 may include one primary controller (e.g., the primary controller 48) and two or more (e.g., 2, 3, 4, 5, 6, or more) backup controllers (e.g., the backup controller 54) for added robustness, accuracy, and security. Accordingly, a multi-directional (e.g., 3, 4, 5, 6, 7, or more-directional) voting circuit may be used to connect the more than two controllers. Similarly, the multi-directional voting circuit may be configured to compare the data of the vehicle 11 received from the more than two controllers.

The primary controller 48 includes various components that may allow for operator interaction with the primary wireless network 50 and the vehicle 11. The primary controller 48 may include a distributed control system (DCS), a programmable logic controller (PLC), or any computer-based automation controller or set of automation controllers that is fully or partially automated. For example, the primary controller 48 may be any device employing a general purpose or an application-specific processor 59. The primary controller 48 may also include a memory 58 for storing instructions executable by the processor 59 to perform the methods and control actions of the system including the primary wireless network 50 and the vehicle 11. The processor 59 may include one or more processing devices, and the memory 58 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 59 or by any general purpose or special purpose computer or other machine with a processor.

The primary controller 48 also includes a primary clock 60 to provide timing information of various operations of the primary controller 48. For example, the position information of the vehicle 11 may be transferred from the vehicle controller 20 to the primary controller 48 via the primary wireless network 50, and the primary clock 60 may time stamp when such position information is collected by the reader 36. Thus, the velocity of the vehicle 11 at a specific time and/or during a period of time may be calculated by the processor 59 of the primary controller 48, additionally or alternatively, by the processor 38 of the vehicle controller 20. The primary clock 60 may be synchronized with the vehicle clock 42, or may run independently of the vehicle clock 42. In some embodiments, the primary clock 60 may also be used as the show clock 53.

Similar to the primary controller 48, the backup controller 54 also includes a processor 62, a memory 64, and a backup clock 66. The processor 62, the memory 64, and the backup clock 66 of the backup controller 54 operates similarly to the processor 59, the memory 58, and the primary clock 60 of the primary controller 48, respectively. The backup clock 66 may be synchronized with the primary clock 60.

Figure 2:
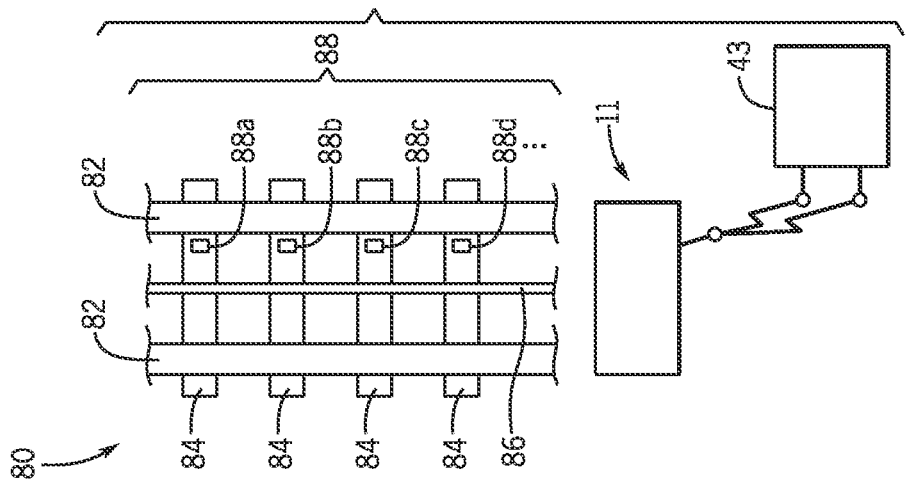
FIG. 2 is a plan view of a track upon which a ride vehicle may travel in accordance with an embodiment of the present disclosure.

FIG. 2 illustrates an embodiment of a path (e.g., a track 80) on which the vehicle 11 is traveling. As noted above, the vehicle 11 may travel in any suitable course with or without the track 80. For example, the vehicle 11 may travel in an open area or in a path with pavement. The track 80 includes a pair of rails 82 that are generally parallel to each other. The wheels 32 of the vehicle 11 contact and travels on the rails 82. The rails 82 are supported by cross beams 84. A bus bar or energizing rail 86 is disposed on the cross beams 84 and provides electrical energy from a power source (e.g., an electrical generator) to the vehicle 11 (e.g., through an electrode attached to the vehicle 11). The track 80 also includes a plurality of position indicators 88 (e.g., 88a, 88b, 88c, 88d). Although FIG. 2 illustrates four position indicators 88a, 88b, 88c, 88d, it is understood that the track 80 may includes any number of position indicators 88. As noted above, the position indicators 88 allow the primary controller 48 to track the position of the vehicle 11 in the course (e.g., along the track 80) via the primary wireless network 50, the vehicle controller 20, and the reader 36 of the vehicle position tracking system 34.

Each of the position indicators 88 represents a specific position in the course. The position information (e.g., coordinates) of the position indicators 88 may be stored in the memory 58 of the primary controller 48. Identifiers (e.g., serial numbers, sequential numbers) of the position indicators 88 may also be stored correspondingly in the memory 58. A distance between any of the two position indicators 88 may be calculated by the processor 59 of the primary controller 48. In operation, when the moving vehicle 11 passes (e.g., within a short distance of) one of the position indicators 88, the reader 36 of the vehicle senses that position indicator 88. Via the vehicle controller 20 and the primary wireless network 50, the primary controller 48 may determine the position of the vehicle 11. As the moving vehicle 11 passes more than one position indicators 88 at different times, which may be time stamped by the vehicle controller 20 and/or the primary controller 48, the velocity of the vehicle 11 may be calculated and stored by the primary controller 48. The backup controller 54 may similarly monitor the position and velocity of the vehicle 11.

As illustrated in FIG. 2, the position indicators 88 (e.g., 88a, 88b, 88c, 88d) are located along the track 80 and are attached on the cross beams 84. It should be noted, however, the position indicators 88 may be placed near and on the track 80 in any suitable fashion. For example, the position indicators 88 may be attached to the rails 82, to the ground between the cross beams 84, or outside of the track 80. The spacing between adjacent position indicators 88 may also be flexible depending on the requirement of the accuracy of the position determination. For example, a longer distance between adjacent position indicators 88 may result in a less accurate determination of the position of the vehicle 20 and its velocity. The position indicators 88 may be attached to the track 88 in any suitable means, including but not limited to, adhesively and mechanically. The reader 36 is typically located on the vehicle 11 to face the path (e.g., the track 80). However, it should be appreciated that the reader 36 may be placed in any other configuration that allows the reader 36 to sense and read the position indicators 88.

In accordance with the present disclosure, any suitable pair or set of features that provide location information may be used (e.g., a central monitoring camera and an identification element on each vehicle). For example, present embodiments may use any identification indicator in the course and a reader on the vehicle 11 that is capable of reading the indicator may be used for position tracking of the vehicle 11. In one embodiment, the position indicator 88 includes passive or active radio frequency electronics, and the reader 36 includes a tuned antenna capable of sensing the position indicator 88. The working frequency of the radio transmission between the position indicator 88 and the reader 36 is different from the operation frequency of the primary wireless network 50 or the backup wireless network 56 to avoid interference. In another embodiment, the position indicator 88 includes a bar code, and the reader 36 includes a bar code reader capable of physically reading the position indicator 88. In yet another embodiment, the position indicators 88 are various marks on a scale that encodes positions, and the reader 36 is a transducer capable of sensing the various marks on the scale. For example, such a scale may be a liner encoder, and the transducer may sense the encoded positions optically, magnetically, capacitively, and/or inductively.

Figure 3:
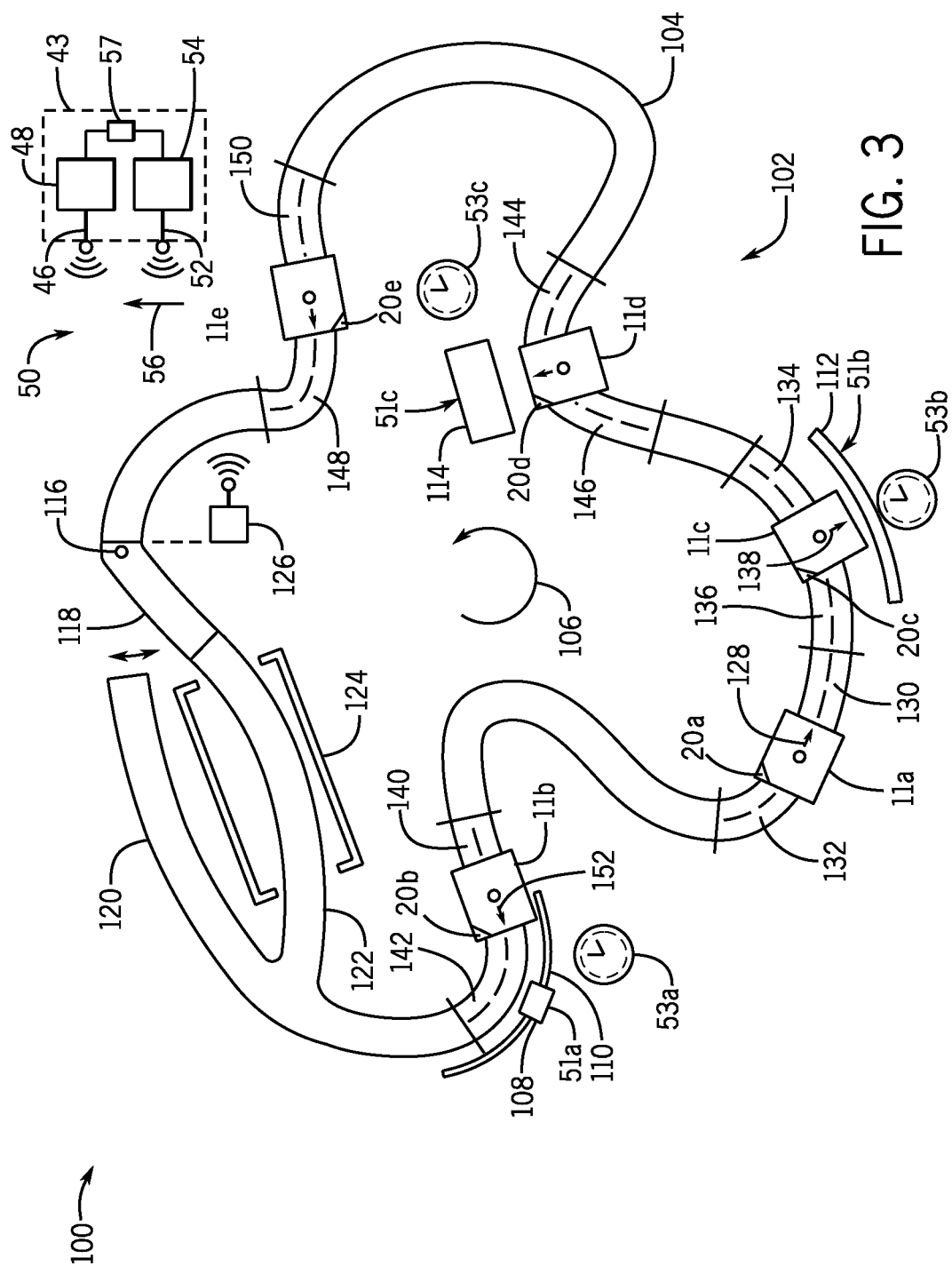
FIG. 3 is a schematic representation of a ride control system including five ride vehicles traveling along a course in accordance with an embodiment of the present disclosure.

FIG. 3 illustrate an embodiment of a ride control system 100 including five vehicles 11a, 11b, 11c, 11d, 11e (e.g., the vehicle 11 of FIG. 1) traveling in a course 102. The course 102 includes a track 104 (e.g., the track 80 of FIG. 2), and the vehicles 11a, 11b, 11c, 11d, 11e travel on the track 104 in a generally counterclockwise direction 106. The course 102 also includes three show events 51a, 51b, 51c (e.g., the show event 51 of FIG. 1) representing three types of show events. The show event 51a represents a show event with a moving show element, for example, a robot 108 moving on a show track 110. The show event 51b represents a show event with projection of a motion picture to a screen 112. The show event 51c represents a show event with animatronics, for example, a walking dinosaur 114. The show events 51a, 51b, 51c include their respective show clocks 53a, 53b, 53c. It should be noted that these show events 51a, 51b, 51c are examples for illustrative purposes and are not meant to be limiting. It also should be noted that the course 102 illustrated in FIG. 3 is for purposes of illustration of the ride control system 100 and not meant to be limiting with regard to its elements. For example, there may be less or more than five vehicles 11a, 11b, 11c, 11d, 11e in the course 102. There may be less or more than three show events 51a, 51b, 51c in the course 102. The layout of the track 80 may be different from the one illustrated in FIG. 3.

The ride control system 100 includes the system controller 43. The system controller 43 includes the primary controller 48 with the connected primary transceiver 46 and the backup controller 54 with the connected backup transceiver 52. The primary controller 48 and the backup controller 54 are connected with each other via the bi-directional voting circuit 57 in the illustrated embodiment. The primary wireless network 50 includes the primary controller 48 and the five vehicle controllers 20a, 20b, 20c, 20d, 20e. The backup wireless network 56 includes the backup controller 54 and the five vehicle controllers 20a, 20b, 20c, 20d, 20e.

The primary controller 48 controls the operations of the show events 51a, 51b, 51 c. In addition, the primary controller 48 controls the operations of a track switch 116. The track switch 116 is configured to switch a bridge track 118 to connect between a main path 120 (e.g., the track 104) and an alternate path 122. The alternate path 122 may include a maintenance station 124. Thus, by operating the track switch 116, a vehicle (e.g., the vehicle 11a, 11b, 11c, 11d, or 11e) may be directed to travel either on the main path 120 in normal operations, or on the alternate path 122 for maintenance or other purposes (e.g., to provide ride variety). The track switch 116 may be connected to the primary controller 48 in any suitable means such as hardwired, wireless, or a combination thereof. For example, the track switch 116 may include a track switch transceiver 126 connected wirelessly with the primary transceiver 46 such that the primary wireless network 50 also includes the track switch 116.

In operation, the primary controller 48 monitors and controls the movement of each vehicle 11a, 11b, 11c, 11d, 11e independently. That is, the primary controller 48 may control each vehicle 11a, 11b, 11c, 11d, 11e to have a different motion profile along the track 104. The motion profile includes, but is not limited to, traveling at a specific speed at a specific position along the track 104, synchronizing with a show event at a specific playing speed of the show event, whether stopping due to the overlap of blocking zones with other vehicles, whether traveling along the alternate path 122, or any combination thereof. The following non-exclusive examples with respect to the five vehicles 11a, 11b, 11c, 11d, 11e may help illustrate the operations of the ride control system 100.

The vehicle 11a travels along the track 104 after passing the show event 51a but not approaching the show event 51b. An arrow 128 indicates a direction in which one or more passengers of the vehicle 11a face based on an orientation of the vehicle 11a. In this case, the arrow 128 points to the front, the traveling direction of the vehicle 11a. Via the primary wireless network 50, the primary controller 48 monitors the status of the vehicle 11a such as the position, velocity, dynamic blocking zone, motor output power, loading condition, or the like. A front region 130 in front of the vehicle 11a and a back region 132 in back of the vehicle 11a illustrate dynamic blocking zones of the vehicle 11a. Likewise, the vehicle 11c, traveling in front of the vehicle 11a, has a front dynamic blocking zone 134 and a back dynamic blocking zone 136. It should be noted that, in certain situations, a particular blocking zone (e.g., blocking zone 136) may correspond to the boundary of a vehicle. For example, a back blocking zone for a particular vehicle or in a particular situation may be aligned with the physical rear boundary of the vehicle.

As illustrated, if the front dynamic blocking zone 130 of the vehicle 11a starts to overlap with the back dynamic blocking zone 136 of the vehicle 11c, the vehicle 11a is about to interfere or could be interfering with the vehicle 11c. Upon detecting such overlap of the dynamic blocking zones 130 and 136, the primary controller 48 may send instructions to the vehicle 11a to decelerate or stop as the vehicle 11c is in the process of viewing the show event 51b. At the same time, as front and back dynamic blocking zones 140, 142 of the vehicle 11b, front and back dynamic blocking zones 144, 146 of the vehicle 11d, and front and back dynamic blocking zones 148, 150 of the vehicle 11e do not overlap with any dynamic blocking zones of any other vehicles, the primary controller 48 may send instructions to the vehicles 11b, 11d, and 11e to maintain their respective movements along the track 104 without necessarily stopping them. In other situations where the dynamic blocking zones of two adjacent vehicles start to overlap, the primary controller 48 may send instructions to the front vehicle to accelerate, or send instructions to both vehicles to stop, in order to avoid interference between the two vehicles while maintaining the movement of other vehicles along the track 104.

The vehicle 11c, as illustrated, is in the process of viewing the show event 51b. As the screen 112 is located on the right side of the track 104, the primary controller 48 may send instructions to the vehicle 11c to control the passenger platform 14c to rotate to face the screen 112. As discussed above, the primary controller 48 may synchronize the movement of vehicle 11c with the show event 51b using the vehicle clock 42 and the show clock 53. For example, the show event 51b may simulate the feeling of watching outside of a spaceship that is flying through a galaxy with many stars. The show event 51b may project a short motion picture showing the flying spaceship and the stars. The vehicle controller 20c may control the passenger platform 14c to move according to the scenes of the motion picture to give the passenger the feeling of sitting in the spaceship that is flying through the stars. The movements, for example, may include rolls and yaws to simulate the spaceship making turns, tilts and surges to simulate the spaceship accelerating, and rotations to simulate the spaceship making rotational moves, etc.

The primary controller 48 may synchronize the movement of the vehicle 11c, such as those described above, with the images of the motion picture. Similarly, the primary controller 48 may operate to provide altered passenger viewing time relative to movement along the track 104 by rotating the ride vehicle as it passes the show event 51b (e.g., turning the riders toward the show event 51b). However, when each vehicle 11a, 11b, 11c, 11d, 11e approaches the show event 51b, their respective velocities may be different due to factors such as the loading condition (e.g., the weight or number of passengers). The primary controller 48 may synchronize the movement of each vehicle 11a, 11b, 11c, 11d, 11e with the show event 51b differently. For example, the primary controller 48 may adjust the playing speed or activation of the motion picture to match the movements (e.g., traveling along the track 104 and internal movement of the passenger platform 14c) of each vehicle 11a, 11b, 11c, 11d, 11 e. Alternatively, the primary controller 48 may adjust the movements of each vehicle 11a, 11b, 11c, 11d, 11 e to match the playing speed of the motion picture during corresponding interaction times.

The vehicle 11b, as illustrated, is in the process of viewing the show event 51a. The show event 51a may include a sequence of movements of the robot 108 on the show track 110. The primary controller 48 may control one or both of the movements of the vehicle 11b and the movements of the robot 108 for synchronization. For example, the primary controller 48 may adjust the traveling velocity of the vehicle 11b and/or speed of the internal movement of the vehicle 11b (e.g., adjusting a direction 152 of the passenger platform 14a relative to the base 12a) to match the operational speed of the sequence of the movements of the robot 108. Similarly as described above, the primary controller 48 may synchronize the show event 51a with different vehicles 11a, 11b, 11c, 11d, 11 e differently, such as adjusting the operational speed to different values to match the different traveling velocity of each vehicle 11a, 11b, 11c, 11d, 11 e. As a specific example, the speed of the robot 108 along the show tack 110 may be synchronized with the speed of the vehicle 11b along the track 104.

The vehicle 11d, as illustrated, is in the process of viewing the show event 51c. The show event 51c may include show elements involving animatronics, for example, a walking dinosaur 114. Similar to other show events described above, the primary controller 48 may control one or both of the movements of the vehicle 11d and the movements of the dinosaur 114, including any other special effects (e.g., sound, visual, water, pneumatic), for synchronization. The synchronization may also be adjusted with respect to each vehicle 11a, 11b, 11c, 11d, 11e.

The vehicle 11e, as illustrated, is approaching the track switch 116. The primary controller 48 may monitor the status of the vehicle 11e to determine if the vehicle 11e takes the main path 120 or the alternate path 122. The determination may depend at least on factors such as the maintenance status of the vehicle 11e, spacing between the vehicles 11a, 11b, 11c, 11d, 11 e, etc. The primary controller 48 may determine the maintenance status of the vehicle 11e based on a trend of loading conditions or motor output power. As discussed above, the vehicle controller 11e may record data regarding the status of the vehicle 11e, such as the loading condition and the motor output power, over a period of time. Such data may be transferred to the primary controller 48 via the primary wireless network 50. The primary controller 48 may compare the collected data to a pre-determined threshold of loading conditions or motor output power to determine whether the vehicle 11e should be scheduled for maintenance. For example, the primary controller 48 may calculate the total loading condition of the vehicle 11e by, for example, multiplying the loading weight per run with the number of runs during the period, and then comparing the total loading condition to a threshold. If the total loading condition is greater than the threshold, the vehicle 11e should be maintained. Otherwise, the vehicle 11e does not need maintenance. However, it should be contemplated that any suitable method may be used by the primary controller 48 to determine the maintenance status of the vehicle 11e. Because the operational history, such as loading conditions or motor output power during a period of time, may vary among the vehicles 11a, 11b, 11c, 11d, 11 e, the primary controller 48 may provide individualized analysis and determination of the maintenance status of each vehicle 11a, 11b, 11c, 11d, 11e.

Furthermore, the primary controller 48 may provide predictive maintenance optimization for each vehicle 11a, 11b, 11c, 11d, 11 e. As described above, the primary controller 48 may record and analyze the maintenance status of each vehicle 11a, 11b, 11c, 11d, 11e during a period of time. Based on such a trend, the primary controller 48 may predict when the next maintenance will be. For example, in the above example, the primary controller 48 may calculate the difference between the threshold and the total loading condition of the vehicle 11e, and divide that difference by the average loading weight per run to estimate the number of runs before the next maintenance. The primary controller 48 may additionally provide reminder messages regarding the due time of the next maintenance.

After determining the maintenance status of the vehicle 11e, the primary controller 48 may control the track switch 116 to correspondingly direct the vehicle 11e to either the main path 120 or the alternate path 122. For example, if the vehicle 11e should be maintained, the primary controller 48 may control the track switch 116 to connect the bridge track 118 with the alternate path 122 such that the vehicle 11e may enter into the maintenance station 124. After the vehicle 11e has entered into the alternate path 122, the primary controller 48 may control the track switch 116 to switch the bridge track 118 back to be connected with the main path 120. During such process, the primary controller 48 may direct other vehicles to maintain their respective operational status without being affected by the vehicle 11e.

Figure 4:
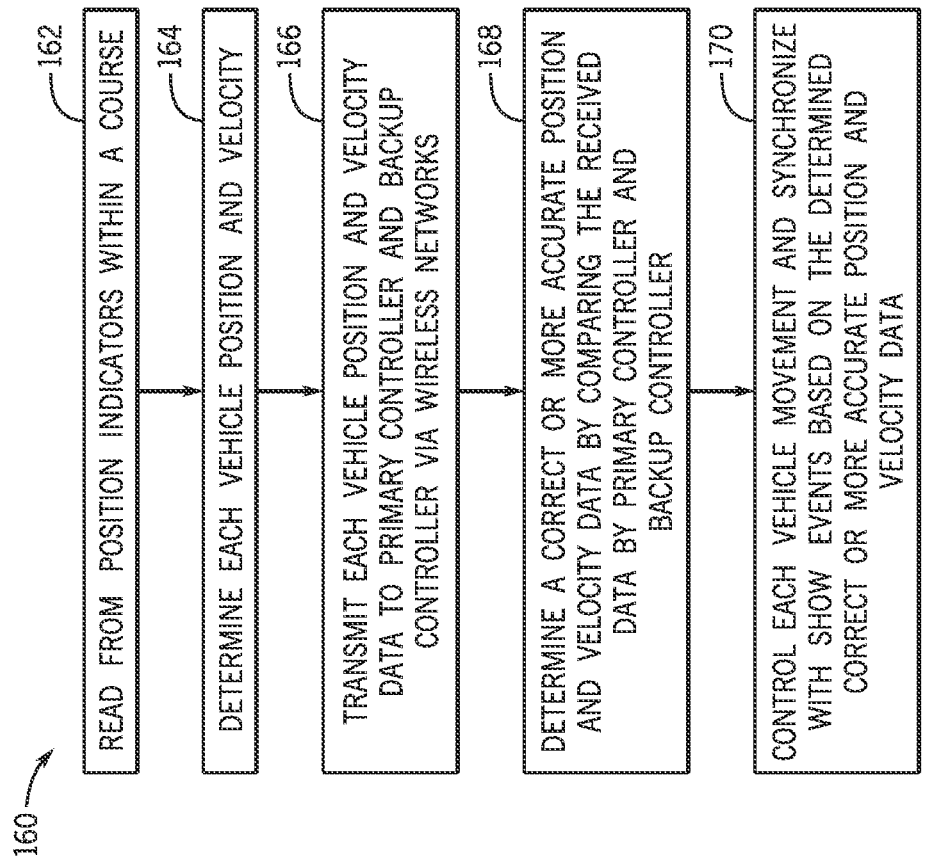
FIG. 4 is a block diagram of a method for monitoring and controlling a plurality of vehicles in a course.

FIG. 4 illustrates a method 160 for monitoring and controlling a plurality of vehicles 11 within a course in accordance with the present disclosure. The method 160 includes reading from position indicators 88 within the course (block 162) by each of the plurality of vehicles 11 or a central monitor to determine the position and velocity of the respective vehicle 11 (block 164). Other data indicative of the status of each of the plurality of vehicles 11 may also be determined, such as the motor output power, the loading condition, and so forth.

The data indicative of the status of each of the plurality of vehicles 11, including the position and the velocity, may then be transferred to the primary controller 48 and the backup controller 54 via the respective primary wireless network 50 and the backup wireless network 56 (block 166). The primary controller 48 is connected with the backup controller 54 via the bi-directional voting circuit 57. The bi-directional voting circuit 57 is configured to compare the two sets of data (e.g., position data, or velocity data) of each of the plurality of vehicles 11 received by the primary controller 48 and the backup controller 54, respectively. The bi-directional voting circuit may then determine a correct or more accurate set of data (block 168). The bi-directional voting circuit may include a processor or circuitry configured to perform an algorithm that analyzes data integrity and reliability based on historical data or predictive calculations or merely based on availability. For example, the bi-directional voting circuit may operate to select data for use based on it being available and uncorrupted (e.g., within predefined value limits).

Based on the determined data, the primary controller 48 sends instructions to each of the plurality of vehicles 11 to control the movement of each of the plurality of vehicles 11 independently (block 170). The movement includes the external movement of each of the plurality of vehicles 11, such as running and stopping within the course. The movement also includes the internal movement of each of the plurality of vehicles 11, such as roll, tilt, and yaw of the respective passenger platform 14 with respect to the respective base 12 of each of the plurality of vehicles 11. For example, the position tracking system 34 or an additional position tracking system may be configured to facilitate identification of a first vehicle component (e.g., a rotatable seating area) location with respect to a second vehicle component (e.g., a base relative to which the rotatable seating area moves). The primary controller 48 may be configured to control a show event based on the first vehicle component location. The primary controller 48 may be configured to control the first vehicle component based on a show event status. Further, the primary controller 48 may direct a first vehicle of the plurality of vehicles 11 to decelerate or stop if the primary controller 48 determines the dynamic blocking zone of the first vehicle starts to overlap with the dynamic blocking zone of a second vehicle traveling in front of the first vehicle. At the same time, the primary controller 48 may direct other vehicles of the plurality of vehicles 11 to maintain their respective motion files.

The primary controller 48 also controls the operations of the one or more show events 51 within the course. In accordance with the present disclosure, the primary controller 48 may independently synchronize the movement of each of the plurality of vehicles 11 with the one or more show events 51 (block 170). The synchronization may depend on at least the status of each of the plurality of vehicles 11, such as traveling velocity and loading condition.

Relative to traditional systems, present embodiments may operate to reduce complex wiring, limit the number sensors, facilitate integration, and reduce maintenance costs. Further, present embodiments facilitate independent control of the movement of individual ride vehicles in a single course. Also, present embodiments facilitate synchronization of individual ride vehicle with show events. For example, when a ride vehicle has a smaller load, which might make it travel faster, present embodiments can either adjust the speed for that particular vehicle or otherwise adjust show events to accommodate the difference without impacting other ride vehicles. Present embodiments also facilitate dynamic adjustment of vehicle spacing, determination of vehicle loading, and maintenance scheduling.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A ride control system, comprising:
a plurality of ride vehicles positioned within a course and configured to travel within the course, wherein each of the plurality of ride vehicles comprises:
a vehicle controller configured to control movement of a respective one of the plurality of ride vehicles;
a position tracking system configured to facilitate identification of a location of the respective one of the plurality of ride vehicles within the course; and
a vehicle transceiver in communication with the vehicle controller;
a primary controller;
a primary transceiver in communication with the primary controller;
a primary wireless network formed by the vehicle transceiver and the primary transceiver to include at least the primary controller and the vehicle controller of each of the plurality of ride vehicles, wherein the primary controller is configured to receive data indicative of the location of each of the plurality of ride vehicles from respective ones of the plurality of ride vehicles via the primary wireless network and wherein the primary controller and the vehicle controller of each of the plurality of ride vehicles are configured to coordinate to provide a control loop for each of the plurality of ride vehicles based on the data indicative of the location of each of the plurality of ride vehicles;
a backup controller configured to receive the data indicative of the location of each of the plurality of ride vehicles from the respective ones of the plurality of ride vehicles via the primary wireless network, wherein the primary controller is configured to control one or more show elements and the backup controller is not; and
a bi-directional voting circuit configured to select between the data received by the primary controller and the backup controller.

2. The ride control system of claim 1, wherein the position tracking system of each of the plurality of ride vehicles respectively includes a reader in communication with the controller of the respective ride vehicle, the reader configured to read position indicators.

3. The ride control system of claim 2, wherein the vehicle controller is configured to determine a location of the respective one of the plurality of ride vehicles based on data provided from the reader based on reading at least one position indicator.

4. The ride control system of claim 1, comprising a plurality position indicators located throughout the course, each of the position indicators corresponding to a specified location within the course.

5. The ride control system of claim 1, wherein the primary controller is configured to transmit instructions to each of the plurality of ride vehicles based on accumulated location information from all or a subset of the plurality of ride vehicles.

6. The ride control system of claim 1, wherein the primary controller is configured to control a show event on or proximate to the course based on the data indicative of the location of each of the plurality of ride vehicles.

7. The ride control system of claim 1, wherein the primary controller is configured to determine a maintenance status of the respective one of the plurality of ride vehicles based on a trend of operation for the respective one of the plurality of ride vehicles.

8. The ride control system of claim 1, wherein the primary controller is configured to receive a first location of a first ride vehicle and a second location of a second ride vehicle and to generate instructions based on the first and second locations for transmission to the vehicle controller of the first ride vehicle for controlling the movement of the first ride vehicle in a manner that differs from the second ride vehicle.

9. The ride control system of claim 1, comprising additional ride vehicles in communication with the primary controller via the primary transceiver, wherein the primary controller and primary transceiver are integral.

10. The ride control system of claim 1, wherein the primary controller and the vehicle controller of each of the plurality of ride vehicles are configured to coordinate to provide dynamic spacing buffers between ride vehicles.

11. A ride control system, comprising:
a plurality of ride vehicles positioned within a course and configured to travel within the course, wherein each of the plurality of ride vehicles comprises:
a vehicle controller configured to control movement of a respective one of the plurality of ride vehicles;
a position tracking system configured to facilitate identification of a location of the respective one of the plurality of ride vehicles within the course; and
a vehicle transceiver in communication with the vehicle controller;
a primary controller;
a primary transceiver in communication with the primary controller; and
a primary wireless network formed by the vehicle transceiver and the primary transceiver to include at least the primary controller and the vehicle controller of each of the plurality of ride vehicles, wherein the primary controller is configured to receive data indicative of the location of each of the plurality of ride vehicles from respective ones of the plurality of ride vehicles via the primary wireless network and wherein the primary controller and the vehicle controller of each of the plurality of ride vehicles are configured to coordinate to provide a control loop for each of the plurality of ride vehicles based on the data indicative of the location of each of the plurality of ride vehicles, wherein the position tracking system is configured to facilitate identification of a first vehicle component location with respect to a second vehicle component, wherein the primary controller is configured to control a show event based on the first vehicle component location.

12. The ride control system of claim 11, wherein the first vehicle component includes a rotatable seating area and the second vehicle component includes a base relative to which the rotatable seating area moves.

13. The ride control system of claim 11, wherein the primary controller is configured to control the first vehicle component location based on a show event status.

14. A ride control system, comprising:
a plurality of ride vehicles positioned within a course and configured to travel within the course, wherein each of the plurality of ride vehicles comprises:
a vehicle controller configured to control movement of a respective one of the plurality of ride vehicles;
a position tracking system configured to facilitate identification of a location of the respective one of the plurality of ride vehicles within the course; and a vehicle transceiver in communication with the vehicle controller;

a primary controller;

a primary transceiver in communication with the primary controller;

a primary wireless network formed by the vehicle transceiver and the primary transceiver to include at least the primary controller and the vehicle controller of each of the plurality of ride vehicles, wherein the primary controller is configured to receive a first set of data indicative of the location of each of the plurality of ride vehicles from respective ones of the plurality of ride vehicles via the primary wireless network;

a backup controller in communication with the primary controller;

a backup transceiver in communication with the backup controller;

a backup wireless network formed by the vehicle transceiver and the backup transceiver to include at least the backup controller and the vehicle controller of each of the plurality of ride vehicles, wherein the backup controller is configured to receive a second set of data indicative of the location of each of the plurality of ride vehicles from respective ones of the plurality of ride vehicles via the backup wireless network; and a bi-directional voting circuit configured to compare the first set of data and the second set of data, and to select between the first set of data and the second set of data, wherein the primary controller or the backup controller, and the vehicle controller of each of the plurality of ride vehicles are configured to coordinate to provide a control loop for each of the plurality of ride vehicles based on one of the first set or the second set of data indicative of the location of each of the plurality of ride vehicles.

15. The ride control system of claim 14, wherein the primary controller and the vehicle controller of each of the plurality of ride vehicles are configured to coordinate to provide the control loop for each of the plurality of ride vehicles based on the first set or the second set of data.

16. The ride control system of claim 14, wherein the primary controller and the vehicle controller of each of the plurality of ride vehicles are configured to coordinate to provide the control loop for each of the plurality of ride vehicles based on the first set of data when the bi-directional voting circuit selects the first set of data, and the backup controller and the vehicle controller of each of the plurality of ride vehicles are configured to coordinate to provide the control loop for each of the plurality of ride vehicles based on the second set of data when the bi-directional voting circuit selects the second set of data.

17. The ride control system of claim 14, wherein one of the primary controller or the backup controller is configured to control a show event on or proximate to the course based on one of the first set or the second set of data indicative of the location of each of the plurality of ride vehicles.

18. The ride control system of claim 14, wherein one of the primary controller or the backup controller is configured to determine a maintenance status of the respective one of the plurality of ride vehicles based on a trend of operation for the respective one of the plurality of ride vehicles.

19. A method for controlling a plurality of ride vehicles within a course, comprising:

identifying a location of each of the plurality of ride vehicles;

transmitting the location of each of the plurality of ride vehicles to a system controller via a primary wireless network, wherein the primary wireless network includes the system controller and a vehicle controller of each of the plurality of ride vehicles;

transmitting the location of each of the plurality of ride vehicles to a backup controller via a backup wireless network, wherein the backup wireless network includes the backup controller and a vehicle controller of each of the plurality of ride vehicles;

selecting one selected location from the location received by the system controller and the location received by the backup controller with a bi-directional voting circuit; and controlling, with the system controller, a movement of each of the plurality of ride vehicles based on the one selected location.

20. The method of claim 19, comprising controlling, with the system controller, a show event on or proximate to the course based on the selected location of a particular one of the plurality of ride vehicles.

* * * * *